Dec. 10, 1946.  A. HOCK  2,412,400
STRAINER
Filed May 22, 1943   2 Sheets-Sheet 1
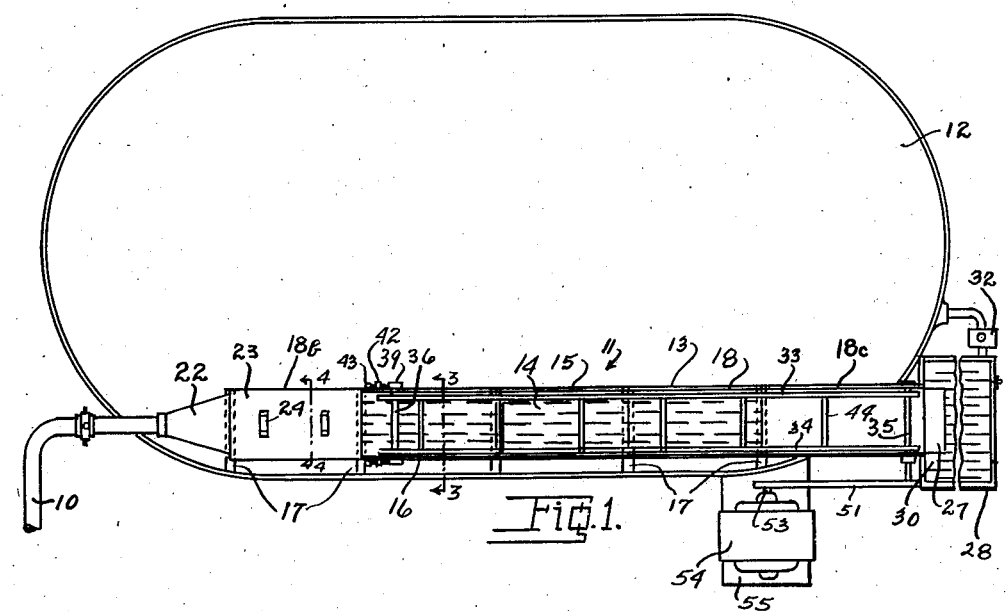
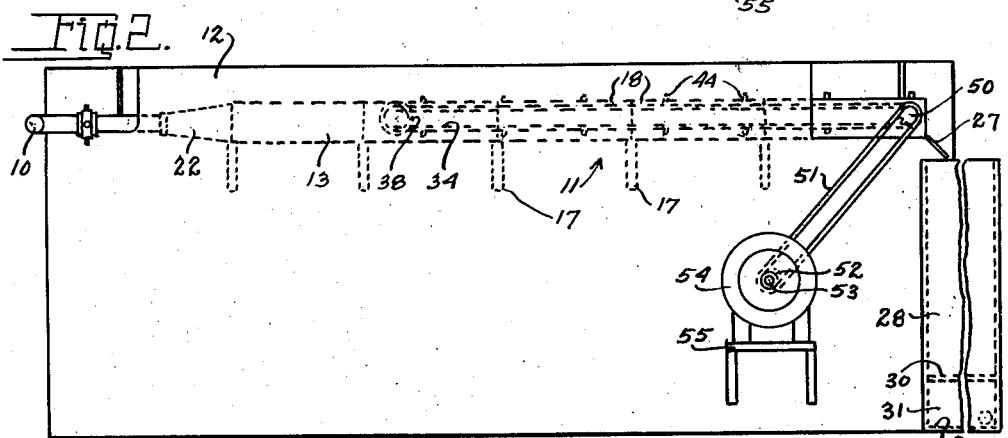
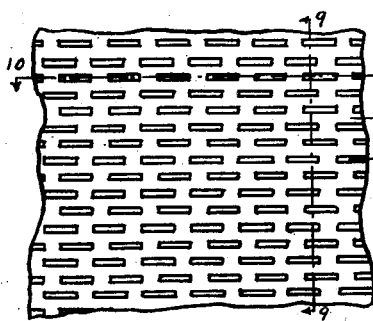
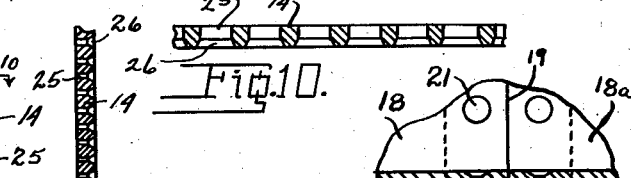
INVENTOR.
ALVIN HOCK.
BY
Joseph A. Rave
Attorney Dec. 10, 1946.   A. HOCK   2,412,400
STRAINER
Filed May 22, 1943   2 Sheets-Sheet 2
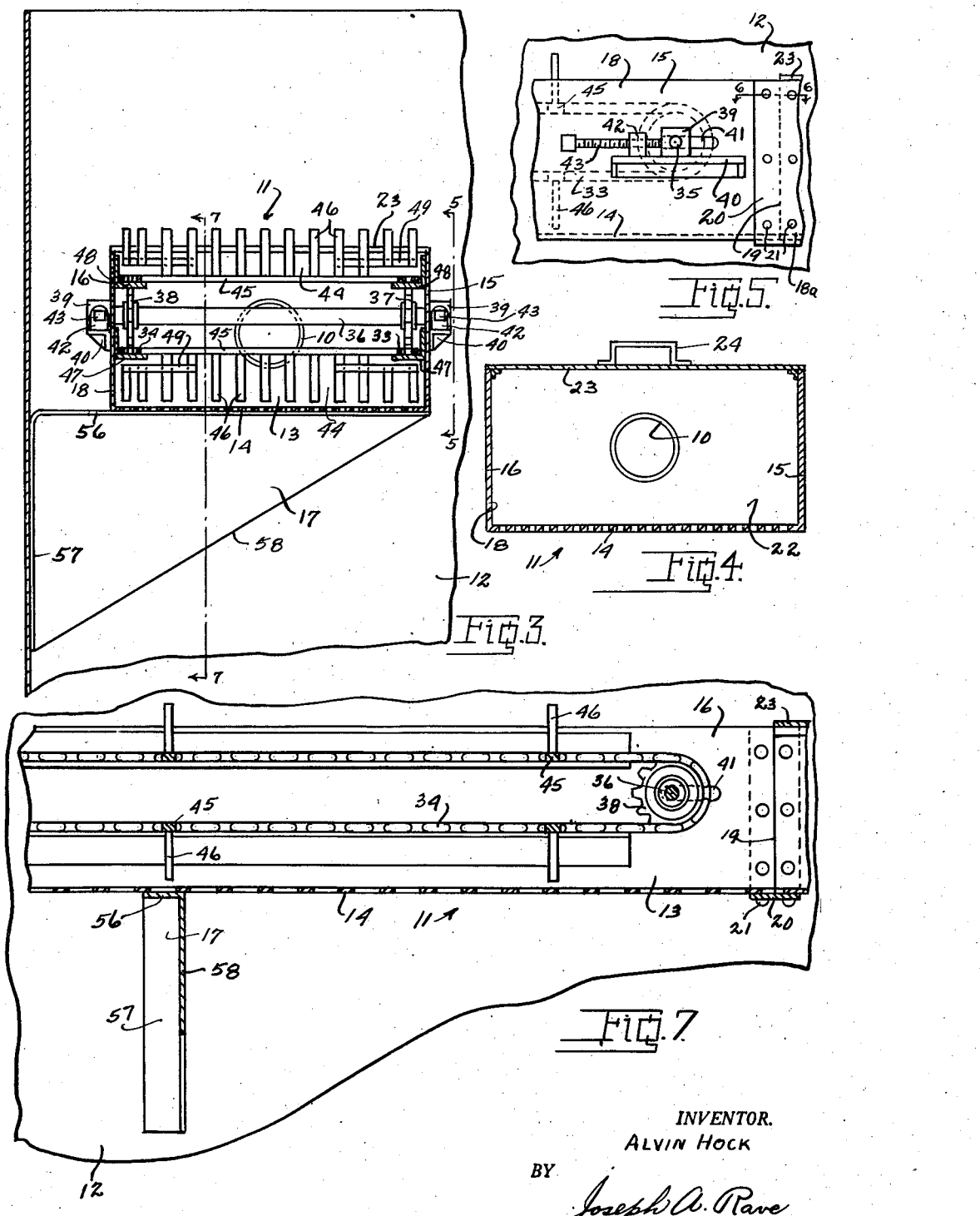
INVENTOR.
ALVIN HOCK
BY
Joseph A. Rave
Attorney Patented Dec. 10, 1946

2,412,400

UNITED STATES PATENT OFFICE 2,412,400

STRAINER

Alvin Hock, Cincinnati, Ohio

Application May 22, 1943, Serial No. 488,068

9 Claims. (Cl. 210—151)

1

This invention relates to improvements in strainers particularly for use in straining fluid from boiled or processed material such as syrup or wort from hop flowers in the manufacture of beer.

In the manufacture of any item for human consumption cleanliness of the machinery used in its manufacture is a prime consideration and this is particularly true in the manufacture of beer. Wherefore it is desirable that such machinery be produced that it may be readily cleaned after each use and without loss of an exorbitant amount of time in such cleaning and dismantling of the machinery. The foregoing desirable qualities in the machinery must be obtained without the sacrifice of efficiency in operation during the process of manufacturing the consumer product. These desirable qualities are obtained by the device of this invention as will be readily apparent.

It is therefore, the principal object of this invention to provide a strainer which will insure the maximum drainage from the processed goods.

It is another object of this invention to provide a strainer which may be readily cleaned to insure the removal of any residue after the preceding manufacturing operation.

It is also an object of this invention to provide a strainer which is relatively simple in construction yet efficient in operation for insuring the maximum drainage from the goods being processed, for example, maximum drainage of syrup from hop flowers during the manufacture of beer.

Other objects and advantages of the present invention should be readily apparent by reference to the following specification considered in conjunction with the accompanying drawings forming a part thereof and it is to be understood that any modification may be made in the exact structural details there shown and described, within the scope of the appended claims, without departing from or exceeding the spirit of the invention.

In the drawings:

Fig. 1 is a top plan view of one form of a syrup collecting tank having associated therewith the strainer of this invention.

Fig. 2 is a side elevational view of the device of Fig. 1.

Fig. 3 is an enlarged fragmentary cross sectional view of the strainer of this invention as seen from line 3—3 on Fig. 1.

Fig. 4 is an enlarged transverse sectional view

2 through the strainer taken on a plane to the left of that of Fig. 3 on line 4—4 on Fig. 1.

Fig. 5 is a fragmentary elevational view of certain parts of the strainer mechanism as seen from line 5—5 on Fig. 3.

Fig. 6 is an enlarged fragmentary sectional view taken on line 6—6 on Fig. 5 illustrating a detail of the construction.

Fig. 7 is a fragmentary, longitudinal sectional view through the strainer as seen from line 7—7 on Fig. 3.

Figs. 8, 9 and 10 are respectively an enlarged elevational view, or vertical sectional view on line 9—9 on Fig. 8 and a horizontal sectional view on line 10—10 on Fig. 8 of a piece of screening material as may be employed in this invention.

Throughout the several views of the drawings similar reference characters are employed to denote the same or similar parts.

The strainer of this invention may be employed generally in industry and will be described in detail in connection with one of its uses, namely, the separation of wort or syrup from the boiled wort.

The wort is delivered by gravity or pumped from the boiling kettle through the pipe 10 to a strainer mechanism indicated in general by the reference numeral 11. The strainer separates the hop flowers from the syrup permitting the syrup to be collected in a tank 12 from which it is drawn for subsequent processing.

The strainer of this invention comprises a trough 13 having a bottom 14 from which sides 15 and 16 upstand. As will be seen in Fig. 1 the trough is of considerable length and made up therefore, of sections each section extending between adjacent supports 17. In Figs. 5 and 6 are illustrated two of the said trough sections 18 and 18a with their adjacent bottom and side edges abutting one another at 19. A connecting band 20 of substantially U shape is provided having a portion thereof on each side of the butt joint 19. A plurality of rivets 21 are then employed for riveting the connecting member 20 to the troughs. As seen in Fig. 6 the heads of the rivets, within the trough, are arranged to be flush with the inner surfaces of the trough bottom and sides thereby providing a smooth inner trough surface with no shoulders to pick up and retain sediment or the like.

The trough 13 at its receiving end is provided with a funnel-like member 22 which has its reduced end connected with the pipe 10. The first section 18b of the trough may be provided with a removable or slip cover 23 to prevent a slopping over of the wort into the tank 12 should the wort be in a state of turbulence or agitation due to being delivered to the strainer trough under pressure. The cover 23 is provided with handles 24 whereby it may be removed to permit the cleaning of the trough section 18b.

As will be seen in Fig. 1 the trough 13 extends for its major portion within the end walls of the tank 12 with, however the end trough section 18c extending beyond the tank. The bottom of the trough section from the entrance section 18b to the discharge section 18c is provided with perforations to permit the draining therethrough of the syrup and the bottom of the section 18b may likewise be perforated but the bottom of section 18c is without such perforations since it projects beyond the tank 12. The perforations may take any form, but preferably, as illustrated in Figs. 8–10, are in the nature of rectangular apertures 25 of relatively little width on the inner surface, but widening out as at 26 on its under surface. This type of material is customary in strainer mechanisms of the class here described.

In operation the wort is delivered in such quantity and force through the pipe 19 to the strainer mechanism 11 that it passes from the entrance section 18b to the discharge section 18c by its own momentum losing the syrup fluid as it passes over the perforations 25. The end of the strainer trough is provided with a downwardly inclined lip 27 which directs the hop flowers into a collecting receptacle or tank 28. The receptacle 28 is provided above its bottom 29 with a false or strainer bottom 30 permitting the drainage of any syrup which may have clung to the hop flowers after it passed the perforations of the strainer bottom. The syrup in the chamber 31 below the strainer 30 is discharged by means of a pump 32 into the tank 12.

It has been found that the hop flowers in passing through the strainer by their own momentum were insufficiently drained and had a tendency to settle on the strainer bottom 14 thereby frequently closing the apertures 25. In order to overcome this, resort is had to an agitating mechanism which cooperates with the normal flow of the wort through the trough, and at the same time keeps the hop flowers in a state of agitation so that all sides of the said flowers are properly drained of their syrup. This mechanism conveniently takes the form of a pair of endless chains 33 and 34 located respectively adjacent the trough sides 13 and 14. Carried by said trough sides 13 and 14 at its discharge end is a shaft 35 provided, adjacent opposite ends, with sprockets about which are trained the chains 33 and 34. Adjacent the receiving end of the trough a similar shaft 36 is mounted having adjacent opposite ends thereof, sprockets 37 and 38 which are similar to the sprockets on the shaft 35 and about which are trained the chains 33 and 34. Associated with the shaft 36 is a chain tightening mechanism illustrated clearly in Figs. 3 and 5 and since these mechanisms are identical on each side of the shaft 36, one of them will be described in detail. Accordingly, a journal or bearing block 39 is slidably mounted on the upper side of a rest or support 40 for longitudinal movement thereon and receives the end of shaft 36 which projects through an elongated aperture 41 in the side of the trough, for example, trough side 15. Secured to and upstanding from the rest 40 is a block 42 having extending therethrough a threaded aperture for a jack screw 43. It will be readily understood that rotation of the screw 43 in a direction to cause its axial movement to the right, as seen in Fig. 5, will correspondingly shift the shaft 36 and thereby increase the distance between the axes of sprocket shafts 35 and 36 for taking up slack in the chains 33 and 34. Connecting the chains at intervals throughout their length are a series of rake like members 44, each comprising a transverse bar 45 from which projects fingers 46 in the nature of teeth of a garden rake.

In order to support the chains 33 and 34 during their movement through the trough as well as the rakes 44, each of the trough sides 15 and 16 is provided with inwardly projecting shelves 47 and 48 conveniently taking the form of angle members with one leg providing the means of attachment and the other leg providing the support. It will be readily understood that the supports 47 support the chains and rakes while they are moving from the intake to the discharge end of the trough while the supports 48 support these parts during the return of the rakes to the intake end of the trough. In order that the rake fingers or teeth may extend entirely across the trough bottom and beneath the lower supports 47 the outer teeth or fingers 46 are carried by a supplemental support bar 49 attached to adjacent fingers or teeth of transverse bar 45.

Any suitable or desirable means may be employed for actuating the chains 33 and 34 and attached rakes, such, for example, as the sprocket wheel 50 secured to a projecting end of the shaft 35 about which is trained a chain 51 in turn extending about driving sprocket 52 on the shaft 53 of electric motor 54. As illustrated in Fig. 2 the motor 54 is supported at 55 adjacent the tank 12.

It will be understood that the strainer mechanism is adequately supported at the upper end of the tank 12 and this support may take any suitable or desirable form such, for example, as brackets 17 one of which is illustrated clearly in Figs. 3 and 7 as a right angle having the upper arm 56 disposed beneath the trough with the vertical arm 57 against the side of the tank 12 and thereby forming a means for attachment as by welding, brazing or the like. To further strengthen the bracket 17 use is made of a web 58 connecting the bracket arms or legs 56 and 57.

From the foregoing it will now be apparent that there has been provided a strainer which is relatively simple in construction yet efficient in operation and having a minimum of corners, crevices and the like behind and in which may lodge sediment and which can therefore be readily maintained in a sanitary condition.

What is claimed is:

1. In a strainer of the class described the combination with a tank, of a trough associated with the tank and having its bottom above that of the tank, said trough having a length with the major portion over the bottom of the tank and a minor portion projecting beyond the tank bottom and said trough including a bottom perforated for the major portion thereof that is over the tank bottom and said remaining portion of the trough bottom imperforate, upstanding sides for the entire length of the trough bottom, the trough having a receiving end above the tank bottom and an open discharge end beyond the tank bottom, a receptacle at the discharging end of the trough for receiving material from the trough, power actuated means within the trough movable from the receiving end to the discharging end thereof for propelling and agitating the material being processed, a removable cover for the trough adjacent its receiving end, and means at the discharge end of the trough for directing the material into the receptacle.

2. In a strainer of the class described the combination with a tank, of a trough associated with the tank and having its bottom above that of the tank, said trough having a length with the major portion over the bottom of the tank and a minor portion projecting beyond the tank bottom and said trough including a bottom perforated for the major portion thereof that is over the tank bottom and said remaining portion of the trough bottom imperforate, upstanding sides for the entire length of the trough bottom, the trough having a receiving end above the tank bottom and an open discharge end beyond the tank bottom, a removable cover for the trough adjacent its receiving end, and power actuated means within the trough movable from the receiving end to the discharging end thereof for propelling and agitating the material being processed.

3. In a strainer of the class described the combination with a tank, of a trough associated with the tank and having its bottom above that of the tank, said trough having a length with the major portion over the bottom of the tank and a minor portion projecting beyond the tank bottom and said trough including a bottom perforated for the major portion thereof that is over the tank bottom and said remaining portion of the trough bottom imperforate, upstanding sides for the entire length of the trough bottom, the trough having a receiving end above the tank bottom and an open discharge end beyond the tank bottom, and power actuated means within the trough movable from the receiving end to the discharging end thereof for propelling and agitating the material being processed, including a plurality of toothed or rake-like members spaced one behind the other.

4. In a strainer of the class decribed the combination with a tank, of a trough associated with the tank and having its bottom above that of the tank, said trough having a length with the major portion over the bottom of the tank and a minor portion projecting beyond the tank bottom and said trough including a bottom perforated for the major portion thereof that is over the tank bottom and said remaining portion of the trough bottom imperforate, upstanding sides for the entire length of the trough bottom, the trough having a receiving end above the tank bottom and an open discharge end beyond the tank bottom, and power actuated means within the trough movable from the receiving end to the discharging end thereof for propelling and agitating the material being processed, including an endless chain, and a plurality of toothed or rake-like members carried thereby in spaced apart relation.

5. In a strainer of the class described the combination with a tank, of a trough associated with the tank and having its bottom above that of the tank, said trough having a length with the major portion over the bottom of the tank and a minor portion projecting beyond the tank bottom and said trough including a bottom perforated for the major portion thereof that is over the tank bottom and said remaining portion of the trough bottom imperforate, upstanding sides for the entire length of the trough bottom, the trough having a receiving end above the tank bottom and an open discharge end beyond the tank bottom, and power actuated means within the trough movable from the receiving end to the discharging end thereof for propelling and agitating the material being processed, including a pair of endless chains located respectively adjacent the inner surface of the trough sides, a plurality of transverse bars extending between said chains and spaced longitudinally thereof, and a plurality of teeth projecting from each bar and spaced longitudinally thereof.

6. In a strainer of the class described the combination with a tank, of a trough associated with the tank and having its bottom above that of the tank, said trough having a length with the major portion over the bottom of the tank and a minor portion projecting beyond the tank bottom and said trough including a bottom perforated for the major portion thereof that is over the tank bottom and said remaining portion of the trough bottom imperforate, upstanding sides for the entire length of the trough bottom, the trough having a receiving end above the tank bottom and an open discharge end beyond the tank bottom, and power actuated means within the trough movable from the receiving end to the discharging end thereof for propelling and agitating the material being processed, including a rotatable shaft at each the receiving and the discharging ends of the trough, a sprocket adjacent each end of each shaft interiorly of the trough sides, an endless chain between and around the sprockets adjacent each trough side, a plurality of transverse bars extending between said chains and spaced longitudinally thereof, and a plurality of teeth projecting from each bar and spaced longitudinally thereof.

7. In a strainer of the class described the combination with a tank of a trough associated with the tank and having its bottom above that of the tank, said trough having a length with the major portion over the bottom of the tank and a minor portion projecting beyond the tank bottom and said trough including a bottom perforated for the major portion thereof that its over the tank bottom and said remaining portion of the trough bottom imperforate, upstanding sides for the entire length of the trough bottom, the trough having a receiving end above the tank bottom and an open discharge end beyond the tank bottom, and power actuated means within the trough movable from the receiving end to the discharging end thereof for propelling and agitating the material being processed, including a rotatable shaft at each the receiving and the discharging ends of the trough, a sprocket adjacent each end of each shaft interiorly of the trough sides, an endless chain between and around the sprockets adjacent each trough side, a plurality of transverse bars extending between said chains and spaced longitudinally thereof, a plurality of teeth projecting from each bar and spaced longitudinally thereof, and means operable on one of said shafts for moving same toward and from the other shaft to properly tension said chains.

8. In a strainer of the class described the combination with a tank, of a trough associated with the tank and having its bottom above that of the tank, said trough having a length with the major portion over the bottom of the tank and a minor portion projecting beyond the tank bottom and said trough including a bottom perforated for the major portion thereof that is over the tank bottom and said remaining portion of the trough bottom imperforate, upstanding sides for the entire length of the trough bottom, the trough having a receiving end above the tank bottom and an open discharge end beyond the tank bottom, and power actuated means within the trough movable from the receiving end to the discharging end thereof for propelling and agitating the material being processed, including a rotatable shaft at each the reeciving and the discharging ends of the trough, a sprocket adjacent each end of each shaft interiorly of the trough sides, an endless chain between and around the sprockets adjacent each trough side, a plurality of transverse bars extending between said chains and spaced longitudinally thereof, a plurality of teeth projecting from each bar and spaced longitudinally thereof, and support means carried by each trough side interiorly thereof for supporting the chains and parts carried thereby during movement.

9. In a strainer of the class described the combination with a tank, of a trough associated with the tank and having its bottom above that of the tank, said trough having a length with the major portion over the bottom of the tank and a minor portion projecting beyond the tank bottom and said trough including a bottom perforated for the major portion thereof that is over the tank bottom and said remaining portion of the trough bottom imperforate, upstanding sides for the entire length of the trough bottom, the trough having a receiving end above the tank bottom and an open discharge end beyond the tank bottom, power actuated means within the trough movable from the receiving end to the discharging end thereof for propelling and agitating the material being processed, means for delivering material to the receiving end of the trough, and a removable cover for the trough receiving end.

ALVIN HOCK.